United States Patent [19]
Deeds

[11] Patent Number: 5,254,297
[45] Date of Patent: Oct. 19, 1993

[54] CHARGING METHOD FOR MELTBLOWN WEBS

[75] Inventor: William E. Deeds, Knoxville, Tenn.

[73] Assignee: Exxon Chemical Patents Inc., Linden, N.J.

[21] Appl. No.: 913,839

[22] Filed: Jul. 15, 1992

[51] Int. Cl.$^5$ .................................... B29C 71/00
[52] U.S. Cl. ................ 264/22; 425/174.8 E
[58] Field of Search ............ 264/22, 24, DIG. 48; 425/174.8 E

[56] References Cited

U.S. PATENT DOCUMENTS

| | | | |
|---|---|---|---|
| 4,215,682 | 8/1980 | Kubik et al. | 264/22 X |
| 4,486,365 | 12/1984 | Kliemann et al. | 264/24 |
| 4,592,815 | 6/1986 | Nakao | 264/22 X |
| 4,904,174 | 2/1990 | Moosmayer et al. | 425/174.8 E |
| 5,122,048 | 6/1992 | Deeds | 425/174.8 E |

FOREIGN PATENT DOCUMENTS

| | | | |
|---|---|---|---|
| 62-250210 | 10/1987 | Japan | 264/22 |
| 62-250211 | 10/1987 | Japan | 264/22 |
| 62-250212 | 10/1987 | Japan | 264/22 |

*Primary Examiner*—Leo B. Tentoni
*Attorney, Agent, or Firm*—R. L. Graham

[57] ABSTRACT

Electrically charged meltblown webs are formed by convergingly discharging electrically charged hot air onto a row of extruded polymer fibers to contact the fibers thereby (i) attenuating and stretching the fibers and (ii) imparting an electric charge to the fibers. The fibers may be continuous or discontinuous.

6 Claims, 2 Drawing Sheets

CHARGING METHOD FOR MELTBLOWN WEBS

BACKGROUND OF THE INVENTION

This invention relates generally to meltblowing apparatus and processes for producing electrically charged meltblown fabrics.

Meltblown nonwoven fabrics display excellent properties for many uses, one of which is liquid and gas filtration. Important filtration parameters such as efficiency and fluid pressure drop can be improved by embedding a static electrical charge within the fabric. In addition, electrically charged nonwoven fabrics may display improved tactile hand. The present invention applies a persistent electrical charge to nonwoven meltblown fabrics.

Meltblown fabrics are generally formed by extruding a molten thermoplastic resin through a die which consists of a horizontal row of small diameter orifices. High velocity sheets of hot air exiting from air passages located just above and below the orifices converge at the die discharge. The convergent air streams induce an aerodynamic drag force upon the extruded polymer fibers as they exit the die. The drag rapidly draws or attenuates the polymer into extremely fine fibers forming a fiber-air stream. The degree of fiber attenuation or, in other words, the final fiber diameter has a significant effect on the final properties of the fabric. The fiber-air stream is directly blown onto a collector apparatus. Here the fibers are deposited forming a nonwoven fabric or web. Nonwoven webs are held together by a combination of fiber entanglement and/or fiber cohesive sticking while still in the semi-molten state. By using a suitable collector apparatus the entire process can be more or less continuous. The term "fiber" includes filaments since the extruded polymer can be deposited as discrete fibers or continuous filaments.

The microscopic diameters(average diameter of 0.5 to 10 microns generally) of the extruded fibers of the meltblown web are well suited to filtering finely divided particles out of a gaseous or liquid fluid. Experimental studies have shown that applying a persistent electrostatic charge to the fibers improves the filter quality. Webs carrying an electrical charge are often called electrets. Nonwoven fibrous electret filters have higher efficiencies, lower fluid pressure drop during filtration, and longer life than non-charged filters. U.S. patents which disclose nonwoven fibrous electrets include U.S. Pat. Nos. 4,215,682, 4,375,718, 4,588,537, 4,592,815, and 4,904,174.

A method for applying an electrostatic charge to the molten or hot fibers during the fabrication process is disclosed in U.S. Pat. No. 4,215,682. The electrostatic charging of the molten or hot fibers permits the charges to migrate into the fibers(since its electrical resistance is lower) and remain trapped upon cooling. This increases the charge life of the electret.

In the processes disclosed in U.S. Pat. Nos. 4,215,682 and 4,904,174, the charges are applied by establishing within a region near the die discharge a corona zone of free electrons and ionized air. The extruded polymer fibers and air stream pass through the dense electron and ionized air field and are charged thereby. The external charging of the fibers limits the proximity of the electron and ionized air field. Because of the spacing required in these devices, the extruded polymer fibers are generally in a semi-molten or solidified state when they pass through the electron or ionized air field.

SUMMARY OF THE INVENTION

In accordance with the present invention, a meltblowing apparatus and method operate by charging the air used to draw down and attenuate the fibers. The meltblowing apparatus may be a conventional die equipped with internal charging elements mounted in the die on opposite sides of the meltblowing die orifices through which the fibers are extruded. With this system, the hot air is ionized within the air flow passages prior to coming into contact with the extruded resin and the formation of the fiber-air stream. In addition to ionized air molecules a number of electrons may also be convected into the fiber-air stream. Upon contacting and mixing with the extruded thermoplastic fibers, the ionized air molecules and electrons attempt to neutralize themselves by transmitting charges to the fibers. The charges are able to penetrate and migrate into the molten or semi-molten thermoplastic resin where they become trapped as the resin cools and solidifies.

In the present invention, the electrostatic charge is applied to the molten or semi-molten thermoplastic fibers almost instantly as they exit the die tip. In the charging system disclosed in U.S Pat. No. 4,588,537, the electrostatic charge is applied after the fibers have been collected and the web has been formed. It is advantageous to apply the charge to the thermoplastic while still in the molten or semi-molten state because its electrical resistance is lower than in the solid phase and the resin will accept charges more readily.

It is also significant that the present invention avoids the problem of bringing the charged particles into contact with the semi-molten fibers as in the case of the charging system disclosed in U. S. Pat. No. 4,215,682. In that system, ambient air is ionized between a high voltage electrode wire and a grounded shell which partially surrounds the wire. This device is located external to the die and does not act directly upon the convergent air streams used for attenuating and blowing the extruded fibers. The ionized ambient air thus formed is subsequently propelled into the fiber-air stream.

In the present invention, the convergent hot air streams for attenuating and blowing the extruded fibers are ionized by placing a high voltage electrode in the hot air flow passages. The electrode may be a metal rod or wire extending across the air passage with the axis of the electrode oriented generally perpendicular to the air flow direction. If the air passages are formed inside the die body, the electrode is mounted so that it is electrically insulated from the die, and the die body itself is electrically grounded.

When the electrode is connected to a high d.c. voltage source, a strong electrostatic field is established between the electrode and the die body. Molecules of air which have been naturally ionized(by molecular collisions, cosmic rays and other natural phenomenon) will be induced to move within the electrostatic field. In the case of a positively charged electrode, electrons and negatively charged air ions will be attracted toward the electrode. If the strength of the electrostatic field is high enough, the ions (especially the electrons), as they are drawn toward the electrode, will receive such large accelerations that, by collision with air molecules, they will produce many more ions by a cascade process. A negatively charged electrode will produce a similar effect, but in the opposite direction. In either case, the air is thus made much more conducting, and the discharge of electrons at the electrode by corona discharge may be very rapid. A large number of ions and charges are thus convected into the fiber-air stream. Within the fiber-air stream, the thermoplastic fibers become charged in the manner discussed above and may be collected to form a nonwoven fibrous electret in a more or less continuous process.

The process of the present invention is characterized by the steps of (a) extruding molten thermoplastic resin through a plurality of orifices to form a plurality of molten fibers, (b) ionizing and charging convergent high velocity hot air streams (c) blowing said convergent sheets of hot, ionized air on both sides of the fibers to (i) attenuate the fibers, (ii) imbed a persistent electrostatic charge within the fibers, and(iii) form a fiber-air stream, (d) collecting the charged fibers to form a fibrous electrically charged web.

Experimental tests have shown that charging the molten or hot fibers in accordance with the present invention produces a filter of exceptional filtration efficiency. Although the present invention has been described in relation to filter applications, it should be pointed out that electrically charged webs may have other applications. The filtration efficiency test is an effective measure of the charge on the webs, even if the webs are used for other applications.

DESCRIPTION OF THE PREFERRED EMBODIMENTS

Figure 1:
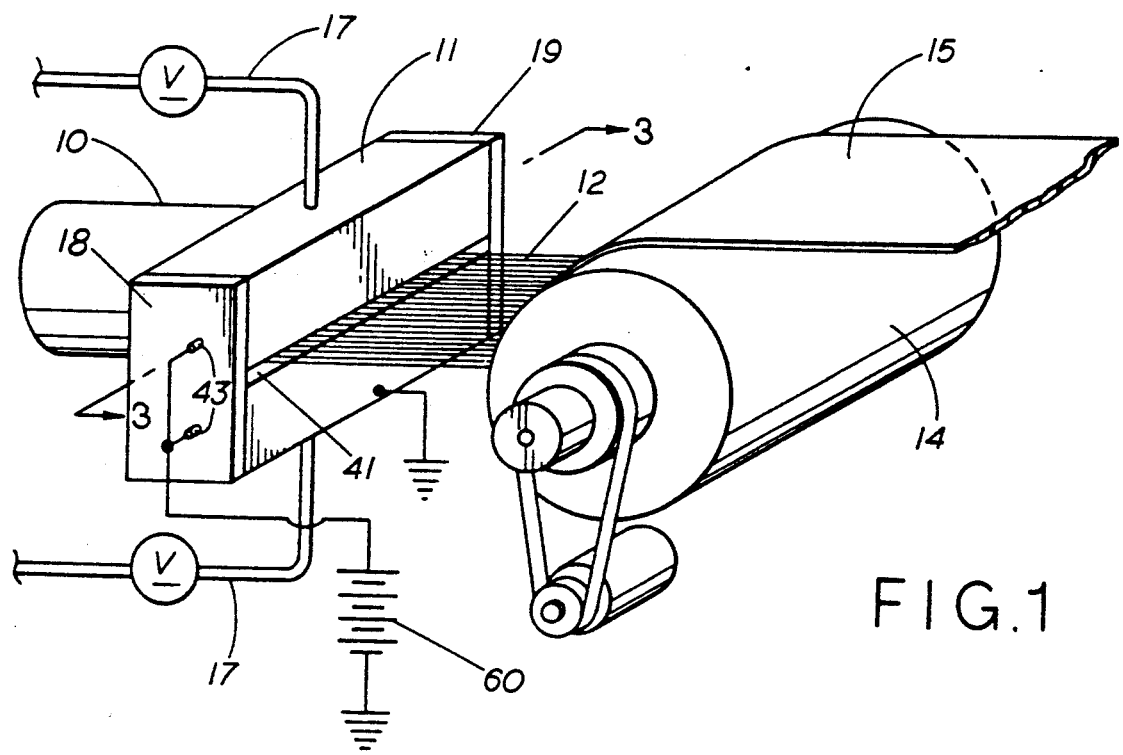
FIG. 1 is a schematic illustrating the main components of a meltblown line provided with the electrostatic apparatus of the present invention.

As stated previously, the present invention relates to the electrostatic charging of meltblown molten or hot fibers to produce electrically charged nonwoven webs. A meltblown line is illustrated in FIG. 1 as comprising an extruder 10 for delivering molten resin to a meltblowing die 11 which extrudes fibers into converging hot air streams which flow from air passages forming a fiber-air stream 12. The fiber-air stream impinges on a rotating collector drum or screen 14 for separating the fibers and air and forming a web 15. Web 15 is withdrawn from the screen 14 and collected as a roll for storage or transportation. The web is held together by fiber entanglement and fiber cohesive sticking while still in the molten or semi-molten state. The typical meltblowing line will also include a compressed air source connected to the die 11 through valved lines 17 and heating elements(not shown).

Figure 2:
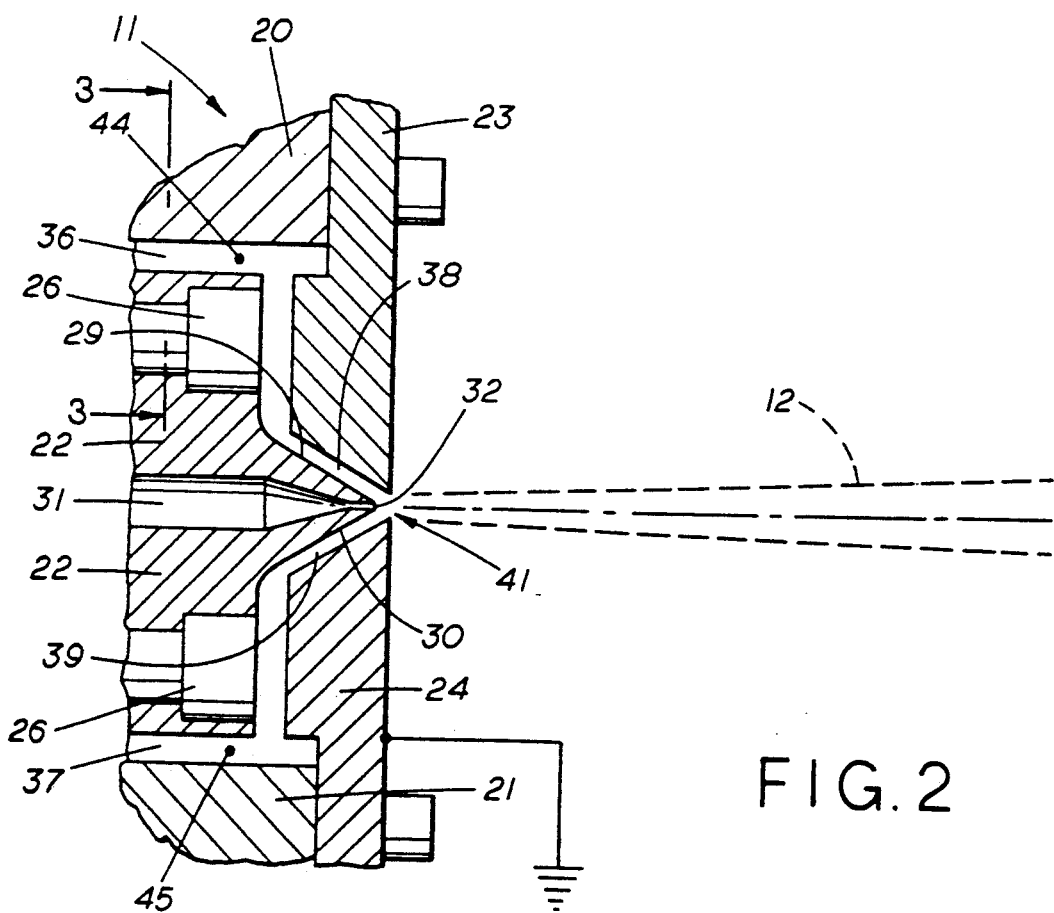
FIG. 2 is a fragmentary, cross sectional view of the die shown in FIG. 1 illustrating the die components and the location of the electrodes in the hot air flow ducts.

As shown in FIG. 2, the die 11 includes body members 20 and 21, an elongate nosepiece 22 secured to the die body by bolts 26, and air knives 23 and 24. The nosepiece has a converging section 29 of triangular cross section terminating at tip 30. A central elongate passage 31 is formed in the nosepiece 22 and a plurality of side-by-side orifices 32 are drilled in the tip 30. The die components are generally manufactured from high quality steel to provide durability. Molten polymer is delivered from the extruder through the die passages of coat hanger configuration (not shown), through passage 31, and extruded as micro-diameter side-by-side fibers from the orifices 32.

The air knives 23 and 24 with the body members 20 and 21 define air passages 36 and 37. The air knives 23 and 24 have tapered inwardly facing surfaces which in combination with the tapered surfaces of the nosepiece define converging air passages 38 and 39. End panels 18 and 19 provide end closures for air passages 36, 37, 38, and 39. The flow area of each air passage 38 and 39 is adjustable. Heated air is delivered from a source via lines 17 through the air passages and is discharged onto opposite sides of the extruded molten fibers as convergent sheets of hot air. The converging sheets of hot air draw or attenuate the fibers forming a fiber and air stream 12 discharging from die discharge 41. The die may be of the same general construction as that described in U.S. Pat. No. 4,904,174, the disclosure of which is incorporated herein. For retrofitting the electrodes in the die, it may be necessary to enlarge a portion of the air passages 36, 37 for receiving the electrodes. As mentioned above, the air passages should provide sufficient clearance to avoid arcing.

In accordance with the present invention, the meltblowing apparatus shown in FIGS. 1 and 2 is provided with means for applying electrostatic charges to the fibers as they discharge from the die discharge opening 41. The electrostatic charges are applied by electrically charging and ionizing the convergent hot air streams which flow through air flow passages 36 and 37. The electrically charged air streams converge at die discharge 41 and mix with the extruded fibers exiting from die orifices 32. The charged air molecules attempt to neutralize themselves by exchanging charges with the extruded fibers. The charged fibers may be collected on rotating collector drum 14 of FIG. 1 and an electrically charged nonwoven fibrous web 15 is withdrawn.

In accordance with the present invention, the meltblowing apparatus of FIG. 2 is equipped with high voltage electrodes 44 and 45 for electrically charging and ionizing the hot air streams flowing through air passages 36 and 37. The electrodes may be a small diameter metal(electrical conductor) rod or wire oriented transversely the air flow direction. In addition, the electrode wires may span the breadth (direction perpendicular to the plane of FIG. 2) of the air flow passages 36 and 37.

In operation, the electrodes 44 and 45 are electrically insulated from the die body components, and the die body components are electrically grounded. A high voltage source is connected to the electrodes 44 and 45 (top/bottom) and the polarity controlled so that the electrodes may have a $+/+$ charge, $+/-$ charge, or a $-/-$ charge configuration. This establishes the electrostatic field and corona zone for charging and ionizing the air flows. As previously discussed, the ionized air molecules will pass charges to the extruded fibers upon mixing in the fiber-air stream. As indicated above, the equipment for installation onto the meltblowing line comprises the electrode wires and a high voltage source. These are discussed in some detail below.

Electrode Wires: The electrode wires 44 and 45 should be electrical conductors and constructed of a material which resists corrosion and oxidation, such as steel.

The diameter of the electrode wires is not critical, however, the wires should be strong enough so they can be mounted in tension to avoid the possibility of the wire electrically shorting-out against the walls of the air flow passages 36 and 37. This possibility arises when considering the aerodynamic loads on the electrode wires due to the air flow. This may give rise to flow induced motions such as flow induced vibrations or simply deflection of the electrode wires due to aerodynamic drag. On the other hand, the wire diameter should obviously be small enough so as not to significantly obstruct the air streams. Electrode diameters of 0.002 to 0.03 inches are preferred and those of 0.005 to 0.02 inches most preferred. The smaller the diameter, the lower the voltage needed to ionize the air.

The electrode wires are located inside the air flow passages 36 and 37 and spaced a sufficient distance from the walls to prevent arcing. This will depend on the voltage and the spacing of the electrode to the air passage walls. A general guideline is to provide 0.1 inch spacing per 3500 volts. Thus, for most dies with a voltage of 5 kV, spacings of 0.15 inches would be adequate.

Figure 3:
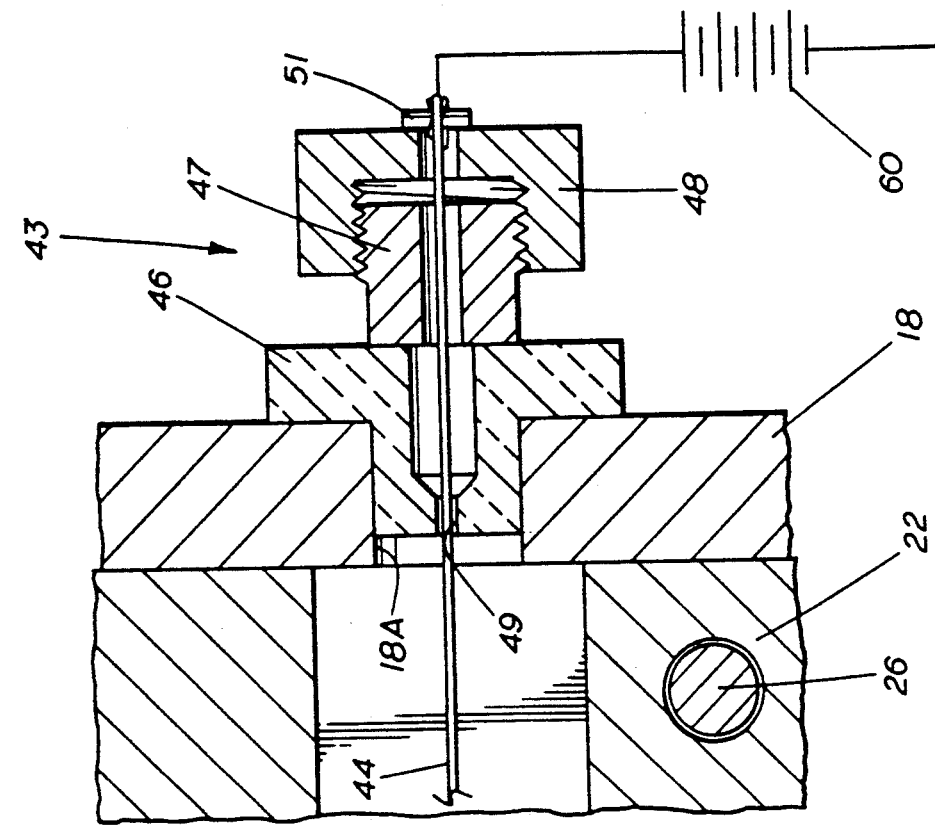
FIG. 3 is an enlarged sectional view illustrating the means for mounting the electrode in the die with the cutting plane taken generally along line 3—3 of FIG. 2.
Figure 3:
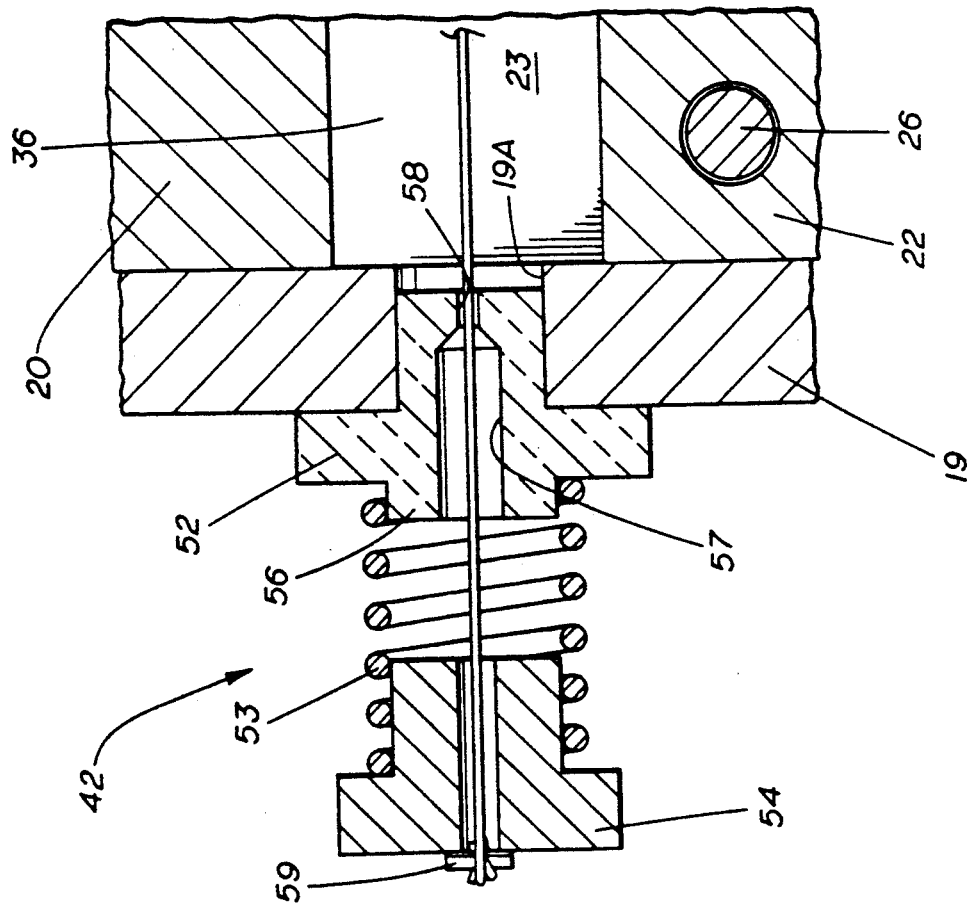

As previously noted, the electrodes are electrically insulated from the die body. Assemblies 42 and 43 may be used to secure opposite ends of the electrode wires to the die body, as illustrated in FIG. 3. Assembly 42 is mounted in hole 19A of panel 19 and assembly 43 in hole 18A of panel 18, with electrode wire 44 stretched therebetween, spanning substantially the length of air passage 36, and generally perpendicular to the air flow therethrough.

Assembly 43 comprises bushing 46 mounted in panel hole 18A, jack member 47 abutting bushing 46, and jack cap 48 threaded to member 47. Bushing 46 is made of an insulating or dielectric material such as ceramic and has a hole 49 sized to sealingly receive wire 44. One end of the electrode wire 44 is attached to the exposed end of jack cap 48 by brazing or a connector as at 51. Connection 51 supports one end of a tensile load in wire 44 induced by assemblies 42 and 43 as described below. The tension is transmitted through the threaded connection between jack cap 48 and retainer 47 and compresses the retainer against bushing 46. Wire 44 extends through the mounting assembly 43, through panel hole 18A, and into air passage 36.

Assembly 42 retains the opposite end of wire 44 and compresses a bushing 52 comprised of a ceramic or dielectric material, spring 53, and retainer 54. Bushing 52 fits into hole 19A in close conformity and supports one end of compression spring 53 on embossment 55. The opposite end of spring 53 seats on retainer 54. Bushing 52 has a large central opening 57, closed at one end which has a small hole 58 formed therein. Wire 44 fits closely in hole 58 to provide a fluid seal therebetween but still permit a small amount of longitudinal movement.

Wire 44 extends through the assembly 42 and is anchored on retainer 54 by a wire clip or other connector 59. The spring 53 urges one end of the wire outwardly from panel 19 maintaining wire 44 disposed in passage 36 in tension and allowing for thermal expansion and contraction. Thus, wire 44 is insulated from the die body by insulated members 46 and 52. Jack cap 48 may be turned relative to member 47 to adjust the compression of spring 53 and, in turn, the tension in wire 44. It should be noted that the spring 53 retains the assemblies 42 and 43 against their respective side of the die 11, so that threaded parts are not essential.

Similar assemblies 42 and 43 are provided to retain wire 45 in air passage 37.

As shown in FIGS. 1 and 3, the wire 44 is connected to d.c. power source 60 and the die body is grounded. The wire 45 is also connected to the d.c. power source as indicated in FIG. 1.

High Voltage Source: Any high voltage d.c. source may be used. The current drawn in the charging process is small (viz. less than 10mA). The source should have variable voltage settings (e.g. 1 kV to 10 kV) and preferably (−) and (+) polarity settings to permit adjustments in establishing the electrostatic field.

Operation: In operation, the electrostatic charge equipment will be mounted on a meltblowing line. The line may employ any of the thermoplastic resins capable of use in meltblowing. The preferred polymer is polypropylene, but other polymers may be used such as low and high density polyethylene, ethylene, copolymers (including EVA copolymer), nylon, polyamide, polyesters, polystyrene, poly-4-methylpentene, polymethylmethacrylate, polytrifluorochloroethylene, polyurethanes, polycarbonates, silicones, and blends of these.

The meltblowing line produces fibers less than 10microns in diameter, typically 1 to 5 microns.

The line is started and once steady state operation is achieved, the electrostatic charge system may be activated. This establishes an electrostatic field between the electrode 44 and the grounded die walls of air passage 36 and between electrode 45 and the die walls of air passage 37. The air passing through the electric field is charged as described previously and contacts the molten polymer fibers as they are discharged from the orifices.

A rotating collector drum or screen, which may include an electrical insulating film over and around the collector surface, is located in the meltblown fiber-air stream. The rate of rotation is adjusted in relation to the fiber-air stream flow rate and the desired web thickness.

As the newly formed web is carried away from the fiber-air stream by the rotating collector drum, it may be withdrawn from the collector by some mechanical means.

EXPERIMENTS

Experiments were carried out on the production of electrostatically charged webs produced with the charging apparatus of the present invention. Web properties including filtration efficiency and sample weight were measured. The test equipment and materials included the following:

Meltblowing Die: 20 inch width with twenty 0.015 diameter orifices per inch; extrusion temperature: 450°–550° F.; polymer flow rate: 0.2 to 0.8 grams per minute per orifice.

Electrodes: Two steel wires 0.010 inches in diameter were installed to span each air passage of a 20 inch long die.

Resins: polypropylene ( PP 3145 marketed by Exxon Chemical Co.)

Charging Device: variable(0 to ±25 kV) d.c. voltage source. The test voltages and polarities are indicated in Table 1.

Filtration Efficiency Measurements: The effect of electrostatic charge was determined by filtration tests using the following apparatus.

Apparatus: Refined surgicos FET apparatus (described in "Automated Test Apparatus for Rapid Simulation for Bacterial Filtration Efficiency"; L. C. Wadsworth; 13th Technical Symposium, International Nonwovens and Disposable Assoc.; Jun. 4–6, 1985; Boston)

Aerosol: 10% suspension of 0.8 or 0.5 micrometer latex spheres in a distilled water fog.
Counting: optical particle counter
Filtration Efficiency (%):

$$\frac{\text{(retained particles)}}{\text{(total particles)}} \times 100$$

Test Results: The filtration efficiency data and basis weight data for charged webs produced using the present invention are shown in Table 1. The corresponding data for a noncharged, but otherwise similar web produced on the same meltblowing line is also shown for comparison as Sample 1. From these data it is evident that the present invention significantly improves the filtration efficiency of nonwoven fibrous webs. It is significant that the filtration efficiencies of the charged webs produced with the present invention are very comparable to those reported for the charging system disclosed in U.S. Pat. No. 4,904,174. This was achieved at much lower voltage. It should also be observed that the internal charging is much safer than the external charging systems of the prior art.

Although the present invention has been exemplified in relation to electrically charged nonwoven webs used for filters, the invention may be used to produce electrically charged webs useful in a variety of other applications.

TABLE 1

| Sample | Electrodes (top/bottom) voltage (kV) | Current (mA) | Basis Weight (oz./yd$^2$) | Filtration Efficiency (0.6 μm) (%) | (0.8 μm) (%) |
|---|---|---|---|---|---|
| 1 (control) | 0/0 | 0/0 | 1.0 | 90.9 | 91.5 |
| 2 | +3.7/+3.3 | 1.0/1.0 | 1.0 | 98.7 | 98.1 |
| 3 | +3.5/+3.1 | 0.5/0.5 | 1.0 | 97.7 | 97.7 |
| 4 | −2.6/−2.4 | 1.0/1.0 | 1.0 | 96.2 | 96.2 |

TABLE 1-continued

What is claimed is:

1. In a meltblowing process wherein a molten thermo-plastic resin is extruded through a plurality of orifices of a meltblowing die to form a plurality of fibers, and wherein hot air streams are blown into contact with the extruded fibers at such an angle to stretch and attenuate the fibers, the improvement comprising:
   (a) electrically charging the hot air streams prior to contacting the extruded fibers; and
   (b) thereafter causing the hot air streams to contact the extruded fibers and impart an electrical charge to the fibers.

2. The method of claim 1 wherein the hot air stream is passed internally through the meltblowing die and wherein the electrical charging is achieved by passing the air streams through an electric field established internally of the die.

3. The process of claim 2 wherein the hot air is charged by passing each stream through an electric field strong enough to ionize the air but below that which produces arcs.

4. The process of claim 3 wherein the electric field is established by an electrode positioned in each stream and spaced from the die, said electrodes being insulated from the die and connected to a high voltage source, and said die being grounded.

5. The process of claim 3 wherein the electric field is established by a voltage high enough to produce corona discharge in the vicinity of the electrode, applied to each electrode and each electrode having a positive polarity.

6. The process of claim 4 wherein the voltage source is positive and is sufficient to produce a charging current of between 1mA and 10 mA.

* * * * *